(12) United States Patent
Stolyar et al.

(10) Patent No.: US 6,590,890 B1
(45) Date of Patent: Jul. 8, 2003

(54) METHOD OF PACKET SCHEDULING, WITH IMPROVED DELAY PERFORMANCE, FOR WIRELESS NETWORKS

(75) Inventors: Aleksandr Stolyar, Basking Ridge, NJ (US); Rajiv Vijayakumar, Ann Arbor, MI (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/517,659

(22) Filed: Mar. 3, 2000

(51) Int. Cl.[7] ............................ H04J 3/24; H04B 7/216; H04L 12/28
(52) U.S. Cl. ...................... 370/349; 370/342; 370/395.4
(58) Field of Search ................................. 370/349, 335, 370/342, 395.32, 411–418, 468, 331, 437; 455/67.1, 522

(56) References Cited

U.S. PATENT DOCUMENTS

| | | | |
|---|---|---|---|
| 5,914,950 A | * | 6/1999 | Tiedemann et al. ......... 370/335 |
| 6,091,717 A | * | 7/2000 | Honkasalo et al. ......... 370/349 |
| 6,335,922 B1 | * | 1/2002 | Tiedemann, Jr. et al. ... 370/335 |
| 6,393,012 B1 | * | 5/2002 | Pankaj ....................... 370/342 |

OTHER PUBLICATIONS

N. Kahale, et al., "Dynamic Global Packet Routing in Wireless Networks", *Proceedings of the INFOCOM '97*, pp. 1414–1421 (1997).6.

P. Bender, et al. CDMA/HDR: A Bandwidth Efficient High Speed Wireless Data Service for Nomadic Users. Preprint, 1999.

U.S. patent application Ser. No. 09/393,949, filed on Sep. 10, 1999.

* cited by examiner

*Primary Examiner*—Steven Nguyen
(74) *Attorney, Agent, or Firm*—Martin I. Finston

(57) ABSTRACT

A new scheduling discipline is disclosed for the forward link of a wireless network such as a CDMA network. The new discipline, which we denominate Modified LWDF (M-LWDF), resembles the known LWDF discipline in that only one queue is served at a time, and the queue to be served is that having the largest weighted delay. According to M-LWDF, the weighted delay of the i'th queue is defined as $$\frac{\gamma_i W_i(t)}{c_i(t)},$$

wherein $W_i(t)$ is a packet delay, a queue length, or an increasing function of packet delay or queue length for the i'th queue, $c_i(t)$ is a weight coefficient descriptive of channel conditions for the i'th user, and $\gamma_i$ is a fixed constant that can be chosen arbitrarily. We have found that if any scheduling discipline can yield stable queues for a given traffic pattern of arriving packets, then M-LWDF can, even under changing channel conditions. Moreover, we have found that M-LWDF can provide favorable QoS in terms of delay bounds.

15 Claims, 4 Drawing Sheets

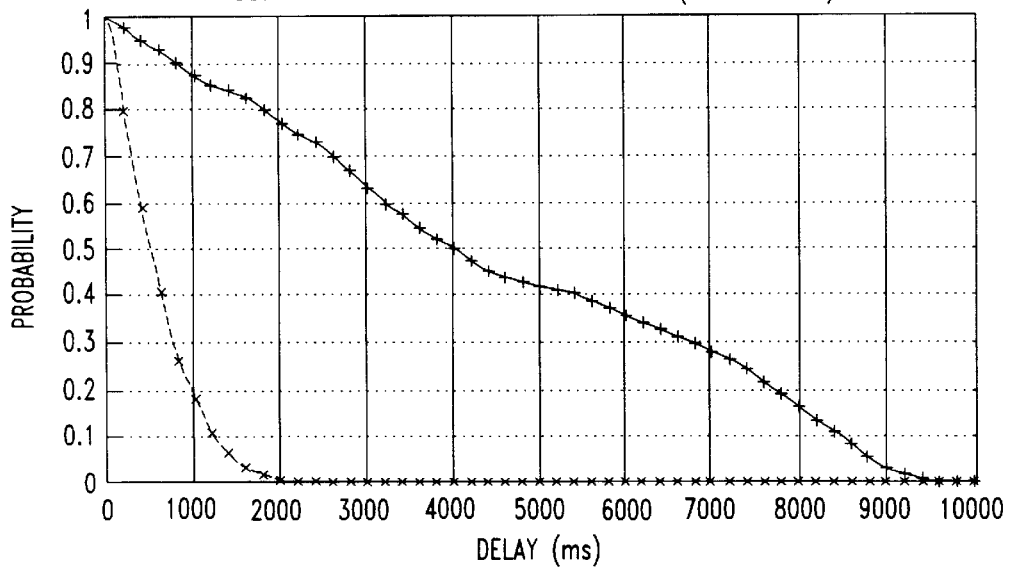
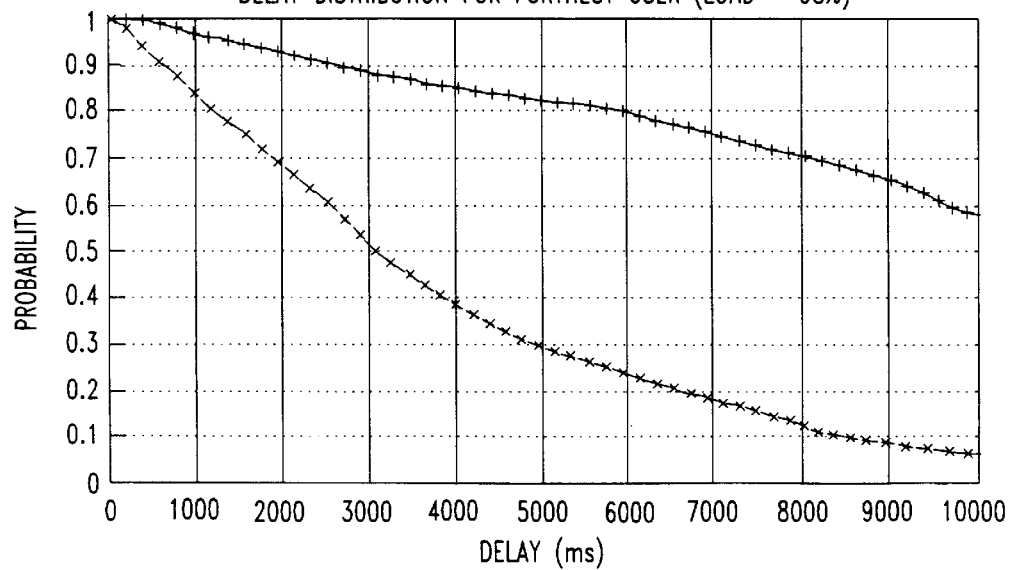

METHOD OF PACKET SCHEDULING, WITH IMPROVED DELAY PERFORMANCE, FOR WIRELESS NETWORKS

FIELD OF THE INVENTION

This invention relates to scheduling disciplines for packet transmissions in a wireless network, and more particularly to the downlink scheduling in a CDMA network.

ART BACKGROUND

Within the base station of a wireless network such as a CDMA network, packets destined for individual mobile stations accumulate in a buffer until they can be served by the base station and transmitted to their destinations. A queue of waiting packets can be identified for each mobile station served by the base station.

An important area of current study is how best to devise a rate scheduling rule (also referred to as a scheduling discipline or queueing discipline) that directs the base station, at a given time, how to allocate its total capacity among individual data transmission rates to the respective mobile stations. Desirably, the rate scheduling rule is devised such that all the queues are stable; that is, in such a way that each queue reaches a steady-state delay that on average does not increase with time. Moreover, it is desirable to devise the rate scheduling rule such that no queue experiences excessive delay as measured, e.g., by the age of the oldest packet in the queue. The age of a packet is typically measured from the arrival timestamp of the packet.

A scheduling rule known to those skilled in the art as Largest Weighted Delay First (LWDF) was described in U.S. patent application Ser. No. 09/393,949, filed on Sep. 10, 1999 by K. Ramanan et al. under the title "Method And Apparatus For Scheduling Traffic To Meet Quality Of Service Requirements In A Communication Network" and commonly assigned herewith. Under the LWDF scheduling rule, only one mobile station (more generally, only one "user") is served at a time, and transmission to that user is made at the greatest available mobile data transmission rate. Within a scheduling interval identified, e.g., by its initial time t, the LWDF rule directs that the base station should serve that queue which has the greatest weighted delay $a_i W_i(t)$, where the number of distinct queues is N, i=1, ..., N, $W_i(t)$ is the delay of the longest-waiting packet in the i'th queue, and $\{a_i\}$ are a set of constants, described in more detail below.

The LWDF discipline is useful, under at least certain conditions, for maintaining packet delays within certain bounds, which we refer to as probabilistic delay bounds. (A probabilistic delay bound is a requirement that with at least a specified probability, packet delays must be less than a specified threshold.) However, LWDF generally provides the best results when channel conditions are constant. Channel conditions are typically characterized by a set of weights $\{c_i\}$, each weight expressing the transmission power required per unit data rate to transmit data to a respective mobile station. Because in many cases there are significant fluctuations in the channel conditions, a need has remained for a scheduling discipline that will dependably provide queue stability and probabilistically bounded delay even in the presence of such fluctuations.

SUMMARY OF THE INVENTION

We have devised a new scheduling discipline, which we denominate Modified LWDF (M-LWDF). We have mathematically proven that if any scheduling discipline can yield stable queues for a given traffic pattern of arriving packets, then M-LWDF can. We have proven that this is so even under changing channel conditions. Moreover, we have found that M-LWDF can provide favorable probabilistic delay bounds. That is, M-LWDF can lead to a low probability that the delay of any queue will exceed a threshold. This probability is also low compared to those delay-violation probabilities typically achieved by, e.g., the known LWDF discipline.

Like LWDF, the M-LWDF discipline directs that only one mobile station should be served at a time. It is generally desirable, although not essential, to serve that one mobile station at the greatest available mobile data transmission rate. Moreover, as will be explained below, certain extensions of pure M-LWDF in which multiple mobile stations may be served at one time also fall within the scope of the invention.

In certain exemplary embodiments of M-LWDF, the queue to be served in each scheduling interval is the queue having a maximum weighted delay. However, the weighted delay is defined differently from the weighted delay of the LWDF discipline. One example of a weighted delay suitable for M-LWDF is $$\frac{\gamma_i W_i(t)}{c_i(t)},$$

where $W_i(t)$ is defined as above, the time-dependence of the weights $c_i(t)$ (which, as noted, reflect channel conditions) is now explicitly indicated, and $\{\gamma_i\}$ is a fixed set of positive constants that can be chosen arbitrarily.

Significantly, each weighted delay now grows larger as the corresponding weight $c_i(t)$ grows smaller. Smaller weights signify better signal-propagation channels, because less power is required for transmission at a given data rate. Thus, the new weighted delay presented above represents a trade-off between two possibly competing effects. On the one hand, the weighted delay tends to grow, and thus the likelihood of serving the corresponding queue tends to grow, as $W_i(t)$ grows, i.e., as the packets of the queue grow older. On the other hand, the weighted delay tends to grow as the weight $c_i(t)$ falls, but tends to fall as the weight $c_i(t)$ rises. Thus, increases in either packet age or channel quality can increase the likelihood of serving the pertinent queue.

The M-LWDF discipline, as we envisage it, is broad enough to encompass other definitions of the weighted delay that also take into account the possibly competing effects of packet age and channel quality. For example, the weight $c_i(t)$ may be normalized by a statistically calculated variable such as its own average or median value $\bar{c}_i$ over an appropriate time interval. According to still other alternate definitions of the weighted delay, the ratio $$\frac{\gamma_i}{c_i(t)}$$

multiplies, not $W_i(t)$, but instead an increasing function of $W_i(t)$. Advantageously, such a function gives preferential weight to queues whose delays (possibly adjusted by a scaling coefficient) exceed by a threshold quantity an average scaled delay, i.e., the scaled delay averaged over all queues. Such a threshold quantity is desirably an increasing function of the average scaled delay.

Although $W_i(t)$ has been described above as representing the age of the oldest packet in the i'th queue, it can also represent the length of the i'the queue, i.e., the amount of data waiting in the queue. Thus, without deviating from the scope and spirit of the invention, queues can be selected on the basis of weighted delay for all queues, weighted queue length for all queues, or weighted delay for some queues and weighted queue length for others.

As noted, pure M-LWDF demands that in each scheduling interval, only one queue should be served. However, the base station in some wireless systems will be prohibited from allocating its full transmission capacity to a single mobile station. In such a case, the maximum transmission rate that is "available" to serve a given queue may not account for the full transmission capacity of the base station. In such cases, for example, it will be advantageous to rank the queues in descending order of their respective weighted delays. The maximum transmission rate available for serving the first queue is allocated for that purpose. Of the transmission capacity that remains, the maximum available rate is then allocated to the next queue, and so on, down through the rank ordering until the total transmission capacity is exhausted. We consider such a scheduling method, in which the weighted delay is defined as in pure M-LWDF, to also fall within the scope of the present invention.

BRIEF DESCRIPTION OF THE DRAWING

FIGS. 3 and 4 are graphs of delay distribution, determined by numerical simulation, resulting from packet scheduling in a model network according to the known LWDF discipline and according to the invention in a first exemplary embodiment.

DETAILED DESCRIPTION

The scheduling method to be described here will be especially useful for downlink scheduling, i.e., for scheduling packet transmissions from the base station to the mobile stations, in CDMA networks. However, our scheduling method is more general in its range of applicability, and we envisage other useful applications in wireless networks of various kinds. For example, our method can be used in a TDMA network to allocate time slots preferentially according to delay, rather than to give equal time to all queues as is done in conventional TDMA. As another example, our method can be used in a CDMA or other method for uplink, rather than downlink scheduling. In the case of uplink scheduling, however, the queues to be served will reside in the individual mobile stations rather than in the base station. Therefore, the base station will need to periodically poll the mobile stations to obtain the delays or queue lengths.

For illustrative purposes, and not for purposes of limitation, it will be assumed in the following discussion that downlink scheduling is to be performed, and that $W_i(t)$ represents delay. As noted, queue length may replace delay as the quantity that $W_i(t)$ represents for one, some, or all of the queues.

Figure 1:
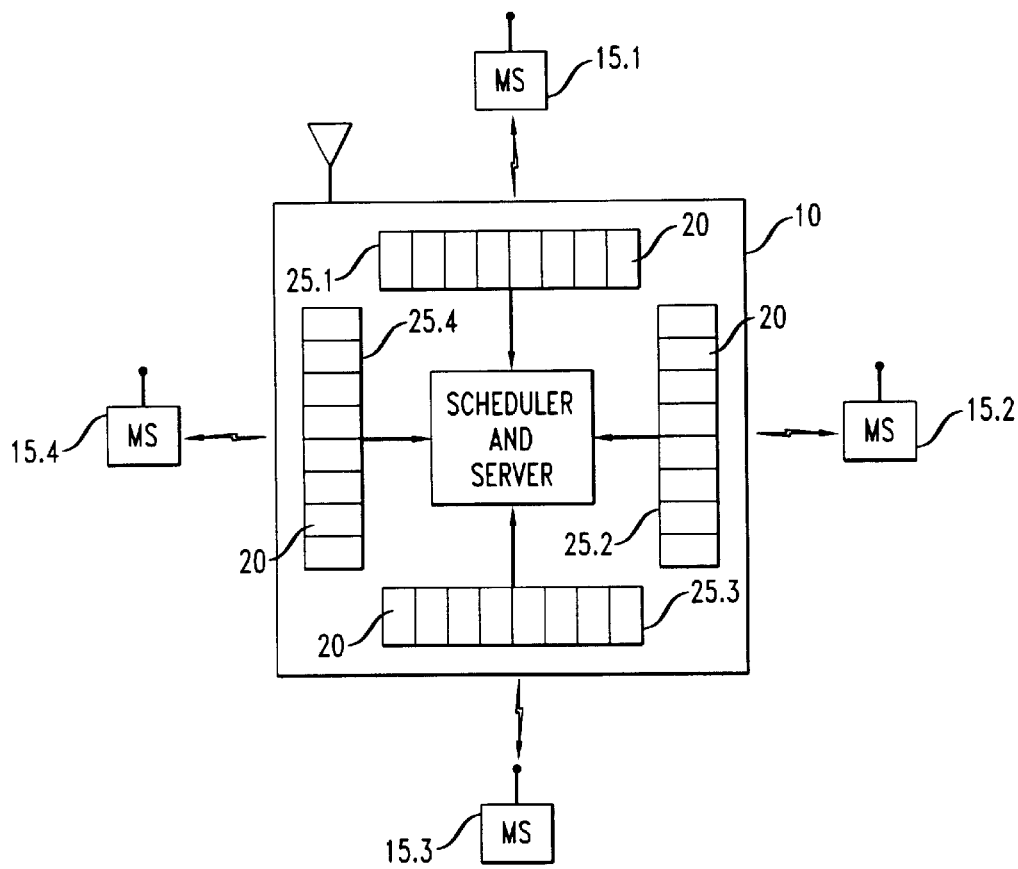
FIG. 1 is a simplified schematic drawing of a cell of a wireless communication system, including mobile stations, a base station, and queues of buffered packets within the base station.

With reference to FIG. 1, element 10 represents a base station serving mobile stations (more generally, "users") 15.1–15.4 within its cell or local reception area. Incoming packets 20 destined for the mobile stations are queued, while awaiting service, in buffers 25.1–25.4, each buffer corresponding to a respective mobile station. Separate buffers are shown for convenience; actual implementations may employ a single buffer, with appropriate logical demarcations of the respective queues. Processing circuitry 30 within base station 10, or otherwise associated with it, schedules the respective queues for service, and serves the packets of each queue by transmitting them to the destined mobile station.

Typically, each packet receives a timestamp upon arrival. From the timestamps, the processing circuitry of the base station can readily determine the age of each packet in each queue.

As noted, in accordance with the M-LWDF discipline, the queue associated with only one mobile station is served in each scheduling interval. Typically, packets will be sent to the served mobile station at the maximum available rate. A typical base station will have available a discrete set of possible mobile-user data-transmission rates. Each rate will have a minimum power requirement dictated, at least in part, by channel conditions and interference conditions. Thus, the maximum "available" rate will be the greatest rate whose power requirement can be met in view of total transmit power available, the possible need to reduce interference in neighboring cells, concurrent demands for transmit power by, e.g., network management and control signals.

It is typical in CDMA systems, among others, for the mobile stations to send periodic signals to the base station that contain indications of channel quality. Such signals may indicate the current signal-to-noise ratio for signals received at the mobile station from the base station, or they may indicate the data rate achievable on the downlink at, e.g., maximum transmit power. If the weights $c_i(t)$ are not received directly, the base station can readily calculate them from transmitted indications of channel quality.

As noted, the weights $c_i(t)$ are recomputed, and the next scheduling decision is made, according to a periodic schedule divided into scheduling intervals. The scheduling interval should be short enough that within a single such interval the weights $c_i(t)$ can be treated as constant without introducing excessive error. Channel fluctuations are caused by fading effects, which tend to be manifested on both a short time scale having a characteristic interval of several milliseconds, and on a longer timescale, having a characteristic interval of seconds, or even tens of seconds. The rapidly fluctuating effects are often referred to as "fast fading," and the slowly fluctuating effects, which may be due, inter alia, to user mobility, are often referred to as "shadow fading."

An exemplary scheduling interval capable of substantially following fast fading effects is 1.67 ms, although intervals as small as 0.5 ms or less and as large as 5 ms or more, are also useful for such purpose.

Figure 2:
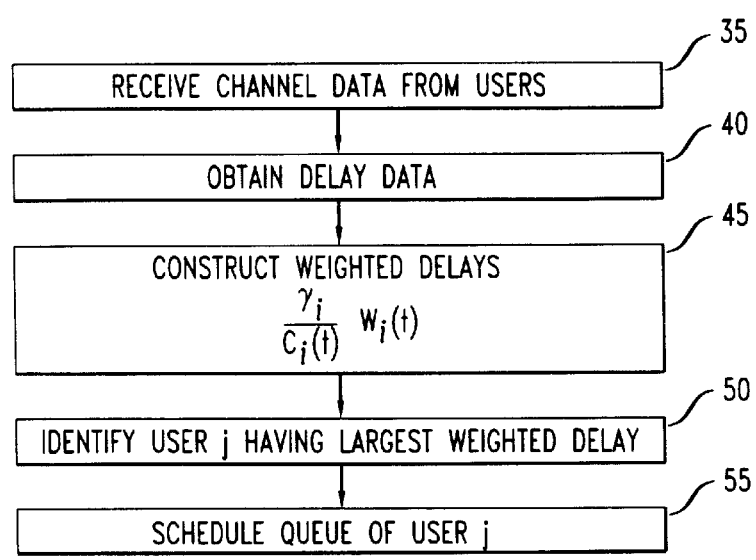
FIG. 2 is a flowchart of a procedure for applying a scheduling discipline for the processing of queued packets,, according to the invention in an exemplary embodiment.

An illustrative sequence of steps performed by a base station during one scheduling interval will now be described with reference to FIG. 2. It should be noted that the particular sequence to be described is meant to be illustrative only, and not limiting as to the scope of the invention.

As indicated at block 35, the base station receives data indicative of channel quality from the users. The base station uses these data to compute the weights $c_i(t)$.

As indicated at block 40, the scheduling circuitry within the base station obtains stored delay data, thereby to obtain the age of the oldest packet in each queue. The delay $W_i(t)$ of the i'th queue is the age of its oldest packet, as measured from the arrival timestamp of the packet.

As indicated at block 45, the weighted delay is computed for each queue. The exemplary formula for the weighted delay given in the figure is $$\frac{\gamma_i W_i(t)}{c_i(t)},$$

discussed above. Alternate formulas for the weighted delay are discussed below.

We have mathematically proven that the coefficients $\gamma_i$ can be set to any arbitrary set of positive values without losing the property that if queues are stable with any scheduling discipline, then they are stable with this scheduling discipline. Thus, in particular, the $\gamma_i$ can be chosen to provide probabilistic limits on packet delays. Such probabilistic limits are one example of what practitioners often refer to as Quality of Service (QoS) requirements.

More specifically, given a delay threshold $T_i$ and a probability bound $\delta_i$ for the i'th queue, a probabilistic limit on packet delay is a requirement that at any given time t, $W_i(t)$ must have a probability no more than $\delta_i$ of exceeding $T_i$. That is, the probabilistic limit requres that $Pr\{W_i > T_i\} \leq \delta_i$. In this context, a queuing discipline having good QoS performance is one that satisfies such a probabilistic limit, with appropriate values of $T_i$ and $\delta_i$. The amount of delay that is acceptable will depend, among other things, on the type of communication service that is involved. For example, voice communication is generally less tolerant of delay than is data communication. Also, specific customers may contract for specific levels of QoS. Thus, one customer may be willing to tolerate more delay than another, because, e.g., he is being charged at a lower billing rate.

One exemplary set of settings for the coefficients $\gamma_i$ is $\gamma_i = -(\ln \delta_i)/T_i$. It should be noted that these settings can incorporate distinct delay thresholds and probability bounds for the respective queues. Thus, users who have contracted for different classes of service will, in fact, receive different levels of QoS performance. The results of numerical simulations in which these settings are adopted is presented in the Example section, below. In the simulations, generally good QoS performance was observed, although some preferential treatment of the users having better channel quality (i.e., lower weights) was observed. In this regard, it should be noted that the resulting steady-state delays can be distributed more equitably if the $\gamma_i$ of the users suffering poorer channel quality are increased by some compensatory factor.

In fact, our numerical simulations have shown that steady-state delays will be distributed more evenly among the various queues if the coefficients $\gamma_i$ are set to $\gamma_i = -(\ln \delta_i)\bar{c}_i/T_i$, where each $\bar{c}_i$ represents a measured short-term average or short-term median value of the corresponding weight $c_i(t)$. (Optionally, a multiplicative constant can be included in the above formula for $\gamma_i$.) A typical time interval for evaluating such a short-term average or median is at least several, e.g., 5, scheduling intervals in length, but smaller than a typical timescale for shadow-fading effects. Thus, such a time interval would typically lie in the range from 10 ms to 1 s, and would most typically be about 100 ms.

It should be noted that one effect of the factor of $\bar{c}_i$ in the above expression for $\gamma_i$ is that the probability of being served is increased for queues having relatively high $\bar{c}_i$, i.e., for queues corresponding to channels that are relatively poor, on average. Thus, at least some of the bias against users suffering poor channel quality, inherent in the previously described scheme, is alleviated. Stated differently, the use of the factor of $\bar{c}_i$, as described here, makes the queueing discipline more responsive to relative rather than absolute differences in channel quality. By "relative" is meant relative to an average or median value $\bar{c}_i$.

In an alternate approach, the settings for the coefficients $\gamma_i$ are as described in either of the preceding examples, but the packet delay $W_i(t)$ is replaced by an increasing function of $W_i(t)$ other than $W_i(t)$ itself. Significantly, this function can be designed in such a way that the probability of serving a given queue will rise relatively rapidly when a scaled delay $a_i W_i(t)$ for that queue, $a_i$ a positive scaling coefficient, begins to exceed a threshold quantity that grows with the overall average scaled delay. In such a scheme, the role of the weighted delays form $$\frac{\gamma_i W_i(t)}{c_i(t)}$$

is assumed, for example, by expressions of the $$\frac{\gamma_i}{c_i} F\left(\frac{a_i W_i}{G(\overline{aW})}\right).$$

In the preceding expression and in subsequent expressions, the explicit time-dependence of $W_i(t)$ and $c_i(t)$ has been suppressed to simplify the notation. In the preceding expression, $\{a_i\}$ are positive scaling coefficients chosen to characterize QoS requirements. Thus, exemplary $\{a_i\}$ will be derived from the QoS parameters that specify the probabilistic delay bound, i.e., derived from $\{T_i\}$ and $\{\delta_i\}$. A particular illustrative example of $a_i$ is a coefficient proportional to, or equal to, $$-\frac{\ln \delta_i}{T_i}.$$

Also in the preceding expression, $a_i W_i$ is the scaled delay for the i'th queue, and $\overline{aW}$ is the scaled delay averaged over all queues, i.e., $$\overline{aW} = \frac{1}{N} \sum_{i=1}^{N} a_i W_i,$$

where N is the total number of queues, $F(\ldots)$ and $G(\ldots)$ are increasing functions. Preferably, $G(\ldots)$ grows less than linearly as its argument increases. The sub-linearity of $G(\ldots)$ assures that when the scaled delay $a_i W_i$ exceeds $\overline{aW}$ by a fixed factor, the probability of serving queue i will tend to increase as the average scaled delay $\overline{aW}$ increases.

We have obtained favorable results, in numerical simulations, using the following formulas for $F(\ldots)$ and $G(\ldots)$:

$$F(W_i; \overline{aW}) = \exp\left(\frac{a_i W_i}{G(\overline{aW})}\right); \quad G(\overline{aW}) = \sqrt{\overline{aW}} + b.$$

In the preceding formulas, b is an appropriately chosen positive constant. In our numerical simulations, for example, we selected the value b=2.5.

Turning again to FIG. 2, as indicated at block 50, the scheduling circuitry identifies the user j associated with the queue having the largest weighted delay. As indicated at block 55, service for user j is then scheduled. User j will then be served throughout the corresponding scheduling interval.

It should be noted that the scheduling procedure described here is also useful when applied to scheduling based on delays of virtual packets, or tokens, in a communication system that offers QoS specified in terms of guaranteed rates to specific users. In such a system, actual arriving packets are queued in buffers, as described above. However, a model, for bookkeeping purposes, is implemented in which, for each user, tokens are treated as arriving at a constant rate. The arriving tokens accumulate in a virtual queue, typically implemented as a software counter. The scheduling decisions are based on the delays of tokens or on the number of tokens in a queue. When a packet is served, however, what is served is the oldest packet from an actual queue in the pertinent buffer. Each time an actual packet is served, a corresponding number of tokens is removed, at least in concept, from a queue of tokens. It should be noted that it may be of concern to certain users whether their rate guarantees are honored, on average, over relatively short time intervals, or only over relatively long time intervals. The shortest averaging interval over which a given rate guarantee is honored may be controlled by appropriate parameter settings, e.g., by appropriate settings of the coefficients $\gamma_i$ discussed above.

EXAMPLE

We performed a series of numerical simulations of a model CDMA cell to determine the delay distribution for selected users under the known LWDF discipline, and under several alternate embodiments of our new M-LWDF discipline. The model cell contained sixteen users uniformly distributed within the cell. The weights $\{c_i\}$ for the respective users are listed in Table 1. The traffic for each mobile was generated by an on-off source, with on and off periods independent and exponentially distributed with means 93 ms and 907 ms, respectively. When the source was on, the (Poisson) flow of packets was generated at the rate of 9 packets per second. The packet sizes were independent and exponentially distributed. The load of the system was adjusted by changing the mean packet size. The delay threshold $T_i$ was set to 3 s for the eight "close" users, i.e. those with the smaller $c_i$, and $T_i$ was set to 7 s for the eight "far" users, i.e., those with the greater $c_i$. The violation probability $\delta_i$ was set to 0.1 for all users.

The scheduling interval was 20 ms. The fading process was modeled by a Markov chain having three states. Under the fading model, each user i has some median fading level $\overline{c}_i$, and at any given moment, $c_i(t)$ is either $(\frac{1}{2})\overline{c}_i$, $\overline{c}_i$, or $2\overline{c}_i$. The transition probabilities among these states are listed in Table 2.

The mean packet length was taken to be 16,000 bits, corresponding to a nominal load of about 98%.

In the results presented in FIGS. 3–8, the packet-delay distribution is plotted for the "closest" (i.e., smallest $c_i$) and "furthest" (i.e., greatest $c_i$) user. In the figures, the horizontal coordinate represents a given amount of delay, and the vertical coordinate represents the probability of delay greater than or equal to the given amount.

FIGS. 3 and 4 show the result of our simulation for the known LWDF discipline, in which the weighted delay is given by $$\frac{-\ln\delta_i}{T_i}W_i$$

(upper curve), and also for an exemplary embodiment of our new M-LWDF discipline, in which the weighted delay is given by $$\frac{-\ln\delta_i}{T_i c_i}W_i$$

(lower curve). FIG. 3 shows results for the closest user, and FIG. 4 shows results for the furthest user.

Figure 5:
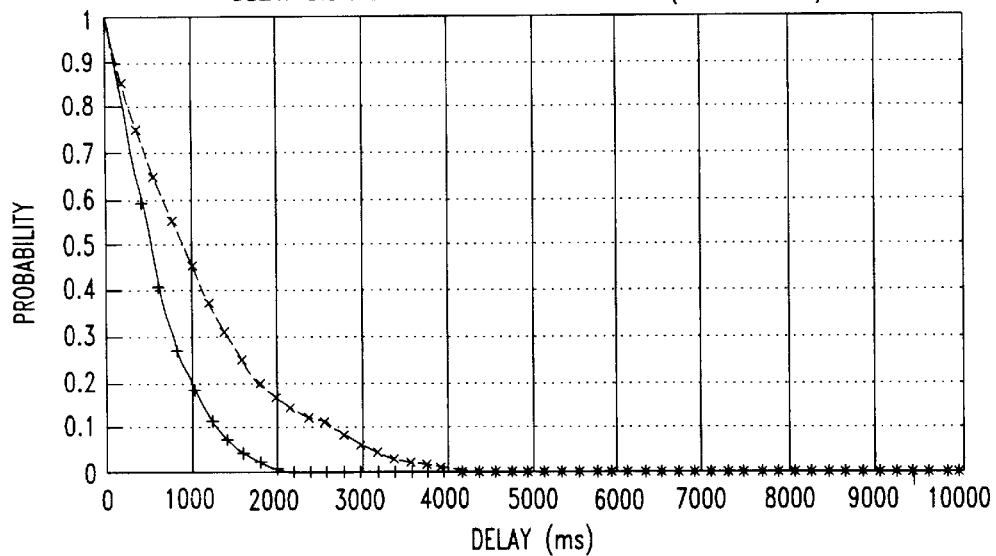
FIGS. 5 and 6 are graphs of delay distribution, determined by numerical simulation, resulting from packet scheduling in the model network of FIGS. 3 and 4 according to the invention in the exemplary embodiment of FIGS. 3 and 4 and according to the invention in a second exemplary embodiment.
Figure 6:
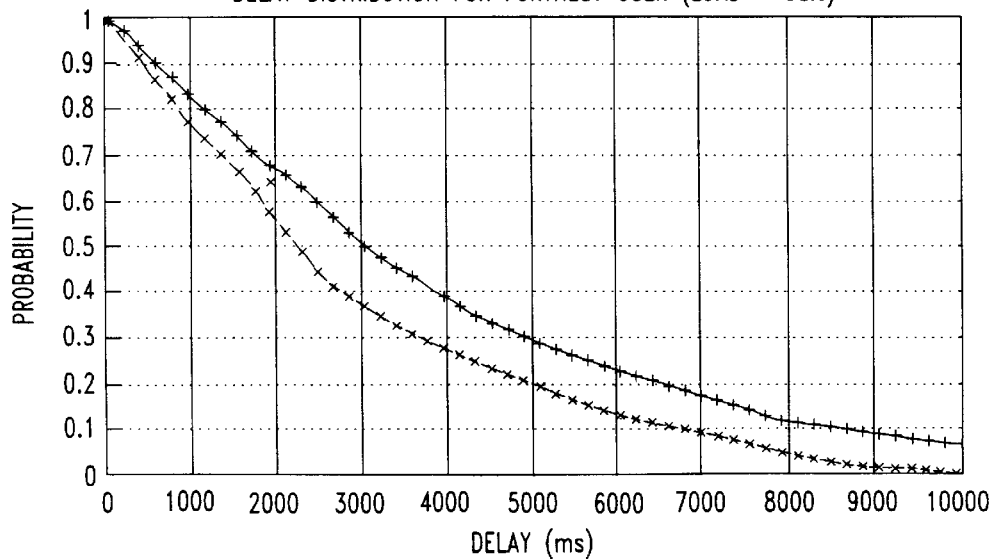

FIGS. 5 and 6 show the result of our simulation for two exemplary embodiments of M-LWDF. In one (lower curve of FIG. 5 and upper curve of FIG. 6), the weighted delay is given by $$\frac{-\ln\delta_i}{T_i c_i}W_i,$$

as in the preceding two figures. In the other (FIG. 5, upper curve; FIG. 6, lower curve), the weighted delay is given by $$\frac{-(\ln\delta_i)\overline{c}_i}{T_i c_i}W_i.$$

FIG. 5 shows results for the closest user, and FIG. 6 shows results for the furthest user.

Figure 7:
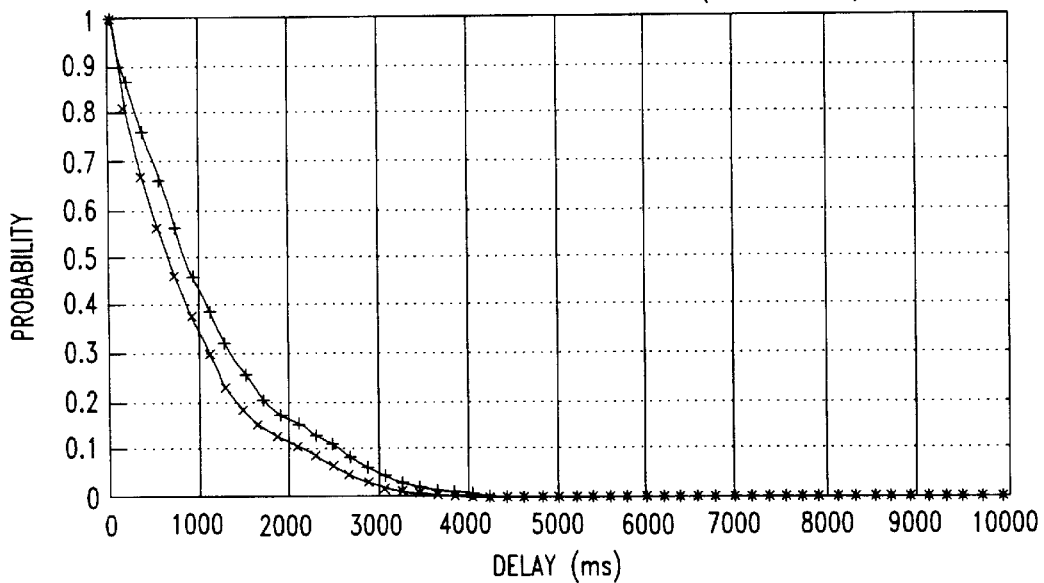
FIGS. 7 and 8 are graphs of delay distribution, determined by numerical simulation, resulting from packet scheduling in the model network of FIGS. 3 and 4 according to the invention in the exemplary embodiment of FIGS. 5 and 6 and according to the invention in a third exemplary embodiment.
Figure 8:
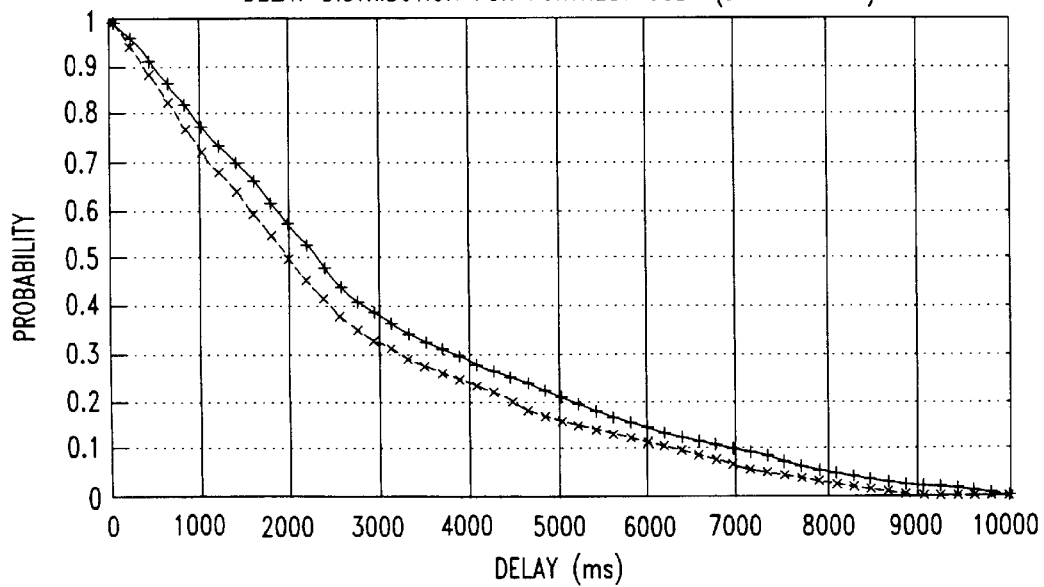

FIGS. 7 and 8 also show the result of our simulation for two exemplary embodiments of M-LWDF. In one (upper curve), the weighted delay is given by $$\frac{-(\ln\delta_i)\overline{c}_i}{T_i c_i}W_i,$$

as in the preceding two figures. In the other (lower curve), the weighted delay is represented by the function $$\frac{\overline{c}_i}{c_i}\exp\left(\frac{a_i W_i}{\sqrt{\overline{aW}}+2.5}\right).$$

FIG. 7 shows results for the closest user, and FIG. 8 shows results for the furthest user.

TABLE 1

| User No. | $c_i$ (W/bps) |
| --- | --- |
| 0 | 2.508 × 10$^{-6}$ |
| 1 | 2.518 × 10$^{-6}$ |
| 2 | 2.518 × 10$^{-6}$ |
| 3 | 2.598 × 10$^{-6}$ |
| 4 | 2.771 × 10$^{-6}$ |
| 5 | 2.924 × 10$^{-6}$ |
| 6 | 3.623 × 10$^{-6}$ |
| 7 | 4.142 × 10$^{-6}$ |
| 8 | 4.307 × 10$^{-6}$ |

TABLE 1-continued

| User No. | $c_i$ (W/bps) |
|---|---|
| 9 | $4.533 \times 10^{-6}$ |
| 10 | $5.229 \times 10^{-6}$ |
| 11 | $6.482 \times 10^{-6}$ |
| 12 | $6.635 \times 10^{-6}$ |
| 13 | $7.257 \times 10^{-6}$ |
| 14 | $7.395 \times 10^{-6}$ |
| 15 | $7.470 \times 10^{-6}$ |

TABLE 2

| From↓ To→ | $(1/2)\bar{c}_i$ | $\bar{c}_i$ | $2\bar{c}_i$ |
|---|---|---|---|
| $(1/2)\bar{c}_i$ | 0.1 | 0.9 | 0 |
| $\bar{c}_i$ | 0.01 | 0.9 | 0.09 |
| $2\bar{c}_i$ | 0 | 0.8 | 0.2 |

The invention claimed is:

1. A method for scheduling queued packets for service by a wireless base station, wherein there is a queue of packets destined for each of a plurality of users, the method comprising:

periodically identifying a queue having a largest weighted delay; and scheduling the identified queue for service, during a scheduling interval, at the greatest transmission rate available for serving said queue; wherein:

(a) each queue i has, at a given time t, a delay $W_i(t)$ determined by one of the following: the age of the oldest packet in said queue; a total amount of data in said queue; in a system in which service of said queue is regulated by a virtual queue that receives tokens at a constant rate, the age of the oldest token in the virtual queue; or the number of tokens in a corresponding virtual queue; and (b) at time t, the weighted delay of each queue i is expressed by $$\frac{\gamma_i}{c_i(t)}$$

times $W_i(t)$, or by $$\frac{\gamma_i}{c_i(t)}$$

times an increasing function of $W_i(t)$, wherein $\gamma_i$ is a constant, and $c_i(t)$ is a weight coefficient that represents the transmission power required per unit data rate to transmit data, at time t, to the user whose destined queue is queue i.

2. The method of claim 1, wherein only the queue having the largest weighted delay is scheduled for service during each scheduling interval.

3. The method of claim 1, wherein the queues are ranked according to weighted delay, and for each scheduling interval, the maximum available rate is allocated first to the queue having the largest weighted delay, and the remaining transmission capacity is allocated to the remaining queues in descending rank order such that the maximum available rate is allocated to each queue until all available transmission capacity is exhausted.

4. The method of claim 1, wherein:

each constant $\gamma_i$ is proportional to $$-\frac{\ln \delta_i}{T_i};$$

$T_i$ is a specified delay threshold for queue i; and $\delta_i$ is a specified maximum probability that the delay of queue i exceeds $T_i$.

5. The method of claim 4, wherein each constant $\gamma_i$ is equal to $$-\frac{\ln \delta_i}{T_i}.$$

6. The method of claim 4, wherein each constant $\gamma_i$ is proportional to $$-\bar{c}_i \frac{\ln \delta_i}{T_i},$$

wherein $\bar{c}_i$ represents a measured short-term average or short-term median value of the weight coefficient $c_i(t)$.

7. The method of claim 6, wherein each constant $\gamma_i$ is equal to $$-\bar{c}_i \frac{\ln \delta_i}{T_i}.$$

8. The method of claim 1, wherein:

the weighted delay of each queue i is expressed by $$\frac{\gamma_i}{c_i(t)}$$

times an increasing function of $W_i(t)$;

said increasing function has the form $$F\left(\frac{a_i W_i(t)}{G(\overline{aW})}\right);$$

$F(\ldots)$ and $G(\ldots)$ are increasing functions;

$a_i$ is a positive scaling coefficient;

$a_i W_i$ is a scaled delay of queue i; and $\overline{aW}$ is a scaled delay averaged over all queues.

9. The method of claim 8, wherein each scaling coefficient $a_i$ is derived from a specified delay threshold $T_i$ for queue i and a specified maximum probability $\delta_i$ that the delay of queue i exceeds $T_i$.

10. The method of claim 9, wherein each scaling coefficient $a_i$ is proportional to $$-\frac{\ln \delta_i}{T_i}.$$

11. The method of claim 9, wherein each scaling coefficient $a_i$ is equal to $$-\frac{\ln \delta_i}{T_i}.$$

12. The method of claim 9, wherein $\overline{aW}$ is the mean value of $a_i W_i$ over all queues i.

13. The method of claim 8, wherein G ( . . . ) is a sub-linear function.

14. The method of claim 13, wherein $G(\overline{aW})$ is equal to $\sqrt{\overline{aW}}+b$, b a positive constant.

15. The method of claim 13, wherein $$F\left(\frac{a_i W_i(t)}{G(\overline{aW})}\right)$$

is equal to $$\exp\left(\frac{a_i W_i(t)}{G(\overline{aW})}\right).$$

* * * * *